United States Patent
Stascjewski

(10) Patent No.: US 6,298,542 B1
(45) Date of Patent: Oct. 9, 2001

(54) PROCESS FOR THE MANUFACTURE OF AN OPTICAL CABLE

(75) Inventor: Harry Stascjewski, Langenhagen (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/292,956

(22) Filed: Apr. 16, 1999

(30) Foreign Application Priority Data

Apr. 17, 1998 (DE) .............................. 198 16 998

(51) Int. Cl.$^7$ .............................. B21D 39/00; B21D 39/03
(52) U.S. Cl. .............................................................. 29/516
(58) Field of Search .............................. 29/779, 781, 819, 29/820, 788, 413, 516, 517, 430; 72/285, 284

(56) References Cited

U.S. PATENT DOCUMENTS

| | | | |
|---|---|---|---|
| 2,110,965 | * | 3/1938 | Singer ...................................... 72/285 |
| 3,207,651 | * | 9/1965 | Hood et al. ........................... 156/466 |
| 3,332,138 | * | 7/1967 | Garner ................................... 29/430 |
| 3,657,793 | * | 4/1972 | Scharf et al. ........................... 72/284 |
| 3,668,916 | * | 6/1972 | Ledebur ................................. 72/284 |
| 3,928,997 | * | 12/1975 | Laws ..................................... 72/180 |
| 3,950,978 | * | 4/1976 | Wassen .................................. 72/285 |
| 4,079,616 | * | 3/1978 | Zazimko et al. ....................... 72/285 |
| 4,090,381 | * | 5/1978 | Babasov et al. ....................... 72/285 |
| 4,212,097 | * | 7/1980 | Portinari et al. ....................... 29/781 |
| 4,291,565 | * | 9/1981 | Saunders ............................... 72/285 |
| 4,441,830 | * | 4/1984 | Italiano ................................ 400/124 |
| 4,734,981 | * | 4/1988 | Ziemek .................................. 29/825 |
| 5,613,631 | * | 3/1997 | Ziemek et al. ....................... 228/148 |
| 5,768,762 | * | 6/1998 | Ziemek et al. ......................... 29/452 |
| 5,975,404 | * | 11/1999 | Ziemek et al. ...................... 228/17.5 |

\* cited by examiner

Primary Examiner—S. Thomas Hughes
Assistant Examiner—Marc Jimenez
(74) Attorney, Agent, or Firm—Sughrue, Mion, Zinn, Macpeak & Seas, PLLC

(57) ABSTRACT

In a process for the manufacture of an optical cable consisting of a metal pipe in which at least one optical fiber is arranged, a metal strip drawn from a supply coil is gradually shaped into a slot pipe. The optical fiber drawn from an additional supply coil is fed to the still open slot pipe, the longitudinal slot of the slot pipe is welded and the diameter of the welded pipe is reduced. The metal pipe is elastically elongated at least after the reduction. The diameter of the pipe is thereby reduced in at least two stages, the value of the reduction being greatest in the last stage.

7 Claims, 2 Drawing Sheets

PROCESS FOR THE MANUFACTURE OF AN OPTICAL CABLE

BACKGROUND OF THE INVENTION

The invention involves a process for the manufacture of an optical cable comprising a metal pipe in which at least one optical fiber is arranged, in which a metal strip drawn from a supply coil is gradually shaped into a slot pipe, the optical fiber drawn from an additional supply coil is fed to the still open slot pipe, the longitudinal slot of the slot pipe is welded, the diameter of the welded pipe is reduced and the metal pipe is elastically elongated at least after the reduction.

A process for the manufacture of an optical cable from a metal pipe is known from DE 44 34 133 A, corresponding to U.S. Pat. Nos. 5,768,762 and 5,975,404, in which a metal strip is shaped into a slot pipe in a continuous procedure and the longitudinal slot is welded. One or more optical fibers and also a viscous paste, e.g. petroleum jelly, for the longitudinal sealing of the pipe are fed to the still open slot pipe. After the welding the outside diameter of the pipe is reduced.

The dimensions of such metal tubes are dependent on the cable construction for which the metal tubes are used.

There are a number of components located in the welding zone of the slot pipe, such as an optical fiber guide pipe, jelly filling pipe, cooling gas duct and inert gas duct, and the diameter of the pipe to be welded is dependent on the number and outside diameter of the optical fibers that must be placed in the optical fiber guide pipe.

The conclusion, that one must produce only the largest possible pipe in order to attain a very large increase in the production rate at the same welding rate via one or more reductions of the pipe, is only conditionally correct. Such limits are set a) by the decrease in the elastic elongation after the reductions of the pipe and thereby obtainable overlength of the optical fiber in the elongation device b) by the material-specific maximum reduction per draw and the hardening of the pipe material during the reduction c) by the permissible drawing forces of the drawing device.

SUMMARY OF THE INVENTION

An object of the present invention is to improve the known process so that a higher production rate can be attained, with the dimensions of the pipe in the welded state remaining the same, i.e. a change of tools not being necessary, so that the number of optical fibers is variable and the overlength can be set almost arbitrarily.

This purpose is realized by reducing the diameter of the pipe in at least two stages with the value of the reduction being greatest in the last stage. The essential advantage of the invention can be seen in the fact that overlengths of the optical fibers can be set from 3% to 5% without considerable modifications at the production site being necessary. In the normal case exchanging the drawing matrices or Turk's-heads is sufficient.

BRIEF DESCRIPTION OF THE DRAWING

The invention will be made clear from the following description in conjunction with the accompanying drawings, in which.

DETAILED DESCRIPTION OF THE INVENTION

Figure 1:
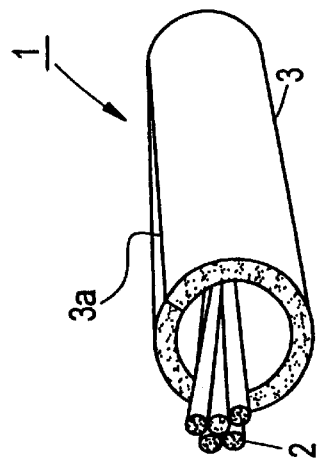
FIG. 1 is a perspective view of part of an optical cable manufactured according to the present invention.

FIG. 1 shows a perspective view of part of an optical cable manufactured according to the teaching of the invention. The optical cable 1 consists of the optical fibers 2 and the metal pipe 3 encompassing the optical fibers 2, which metal pipe has a straight weld 3a. The space between the optical fibers and the metal pipe 3 can be filled with a so-called petroleum jelly to ensure a longitudinal water tightness. The optical fibers 2 have a greater length than the metal pipe 3 and thus run through the metal pipe 3 in an undulating, helical or sinusoidal manner.

Figure 2:
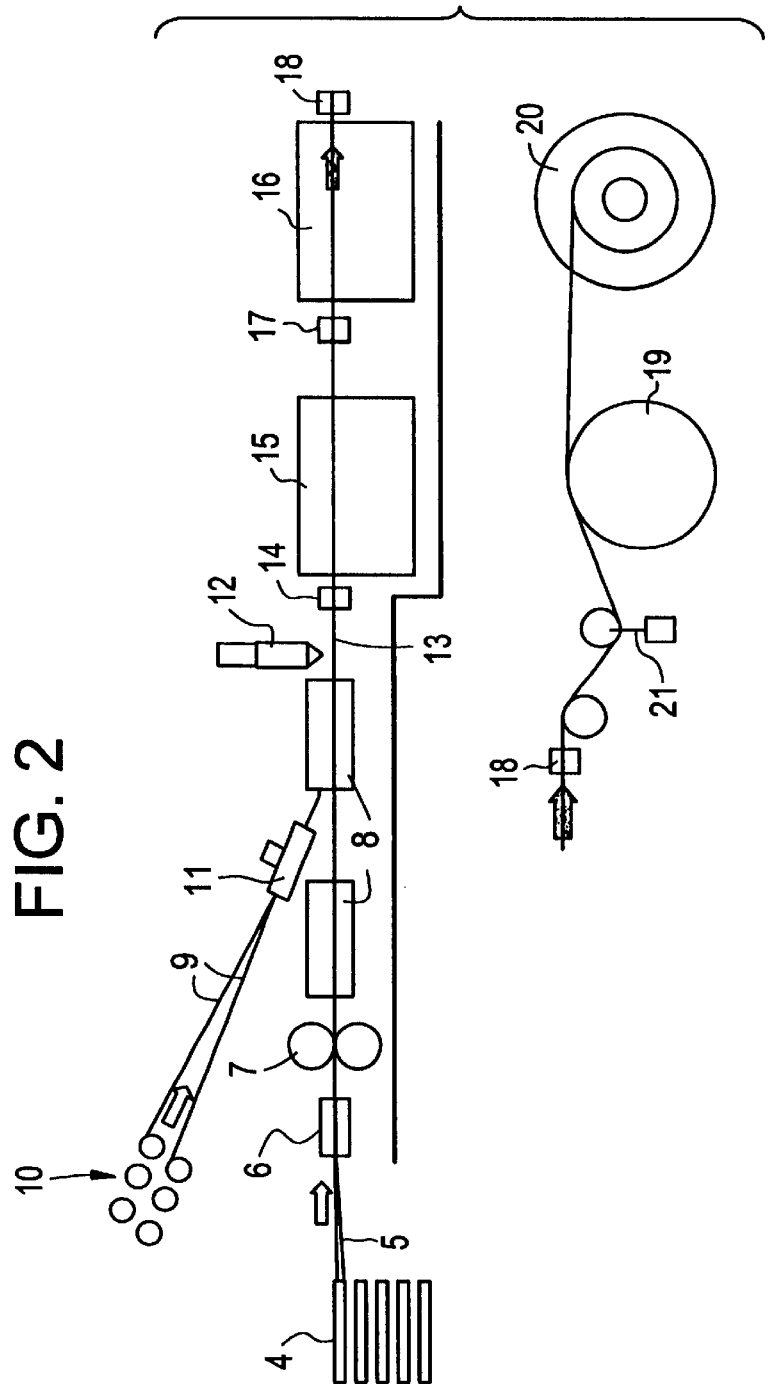
FIG. 2 is shows a side view of a production arrangement for manufacturing the cable of FIG. 1.

FIG. 2 shows a side view of a production arrangement. A metal strip 5, preferably a strip of stainless steel, is continuously drawn from a strip supply 4. The speed of the strip 5 is reduced by a strip brake 6. Side-cut shears 7 edge-plane the metal strip 5 on its longitudinal edges, so that on the one hand a uniform strip width is always present, and on the other metallically pure strip edges are always present. In a forming device 8 the metal strip 5 is gradually shaped into the slot pipe. Optical fibers 9, which are drawn from supply coils 10, are fed to the still open slot pipe. A filler device 11 pours a petroleum jelly into the slot pipe. The slot pipe is welded at its strip edges by means of a laser welding head 12, and the diameter of the welded pipe 13 is reduced by means of a reducer 14, for example a drawing matrix or a so-called Turk's-head. To apply the forces, the forces that are necessary for drawing and shaping the metal strip 5 and also for pulling down the metal pipe 13 are applied by means of a pull-in collet 15. An additional pull-in collet 16 is arranged behind the pull-in collet 15. A second reducer 17 is provided between the pull-in collets 15 and 16, which reducer is either a drawing matrix or a Turk's-head.

A third reducer 18 is arranged behind the pull-in collet 16. The drawing force for the pipe behind the third matrix 18 or the third Turk's-head is applied by a pull-off capstan 19, around which the pipe is wrapped in several windings. The pipe running from the pull-off capstan 19 is coiled up on a take-up reel 20.

The overlength of the optical fibers 9 in the metal pipe 13 is now produced by elastic elongation of the metal pipe 13 between the reducer 18 and the pull-off capstan 19. For this purpose a weight 21, for example, is suspended from the metal pipe 13 in a simple manner. The elastic elongation is compensated for on the pull-off capstan 20. Since the optical fibers 9 are drawn off at the same rate as the elastically elongated metal pipe 13, compensation for the elastic elongation produces an overlength of the optical fibers 9 in the metal pipe 13, which overlength is dependent on the size of the weight 21.

The draw rate of the pull-in collets 15 and 16 and also of the pull-off capstan 19 is controlled by so-called dancer units, which are not shown.

It is essential for the invention that the reduction of the metal pipe 13 is greatest in the last drawing stage, i.e. in the third reduction stage 18, in order to obtain the greatest possible elastic elongation.

The percentage reduction of the metal pipe 13 in the third reduction stage 18 is preferably greater than the sum of the percentage reductions of the metal pipe 13 in the first and second reducers 14 and 17.

Figure 3:
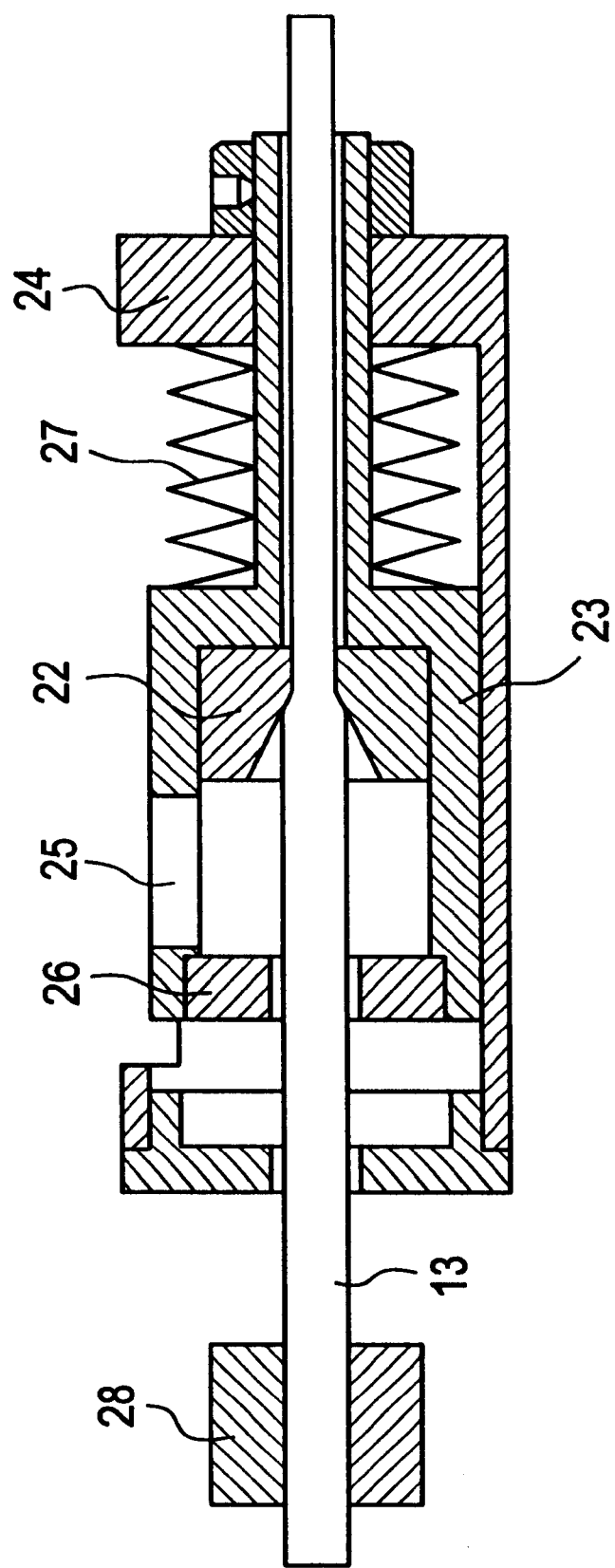
FIG. 3 shows an especially advantageous arrangement of reduction stages 14, 17 and 18 in the arrangement of FIG. 2.

FIG. 3 shows an especially advantageous arrangement of reduction stages 14, 17 and 18. The die or the matrix 22 is arranged in a mount 23, which in turn is loaded in a die retainer 24 so that it can be moved longitudinally. A pipe guide 26 is located at the entrance of the mount. In addition, an aperture 25 is provided in the mount 23, through which the mount 23 can be filled with drawing compound. The mount 23 is spring-loaded in the die retainer 24 via spring washers 27. The spring washers 27 are prestressed when the metal pipe 13 is pulled. Another dancer unit 28 controls the draw rate of the pull-in collet.

The advantage of spring-loading the mount 23 in the die retainer 24 consists of the fact that if the production is interrupted after the metal pipe 13 returns to its former position via the pull-in collets for the weld-overlaying of the weld seam of the metal pipe 13, a shock-like start-up of the draw at the reduction stages is prevented.

It goes without saying that a draw matrix or a Turk's-head can be used as desired in each reduction stage.

What is claimed is:

1. A process for the manufacture of an optical cable comprising a metal pipe in which at least one optical fiber is arranged, said process comprising the steps of:

drawing a metal strip from a supply coil and gradually shaping said strip into a slot pipe having a longitudinal slot, feeding the optical fiber drawn from an additional supply coil to the slot pipe, welding the longitudinal slot of the slot pipe, reducing the diameter of the welded pipe, and elastically elongating the metal pipe, wherein said reducing step comprises reducing the diameter of the pipe in at least two stages with the amount of the reduction being greatest in the last stage.

2. A process according to claim 1, characterized in that the amount of the reduction in the last stage is at least 10% greater than in each of the previous stages.

3. A process according to claim 1, in which the metal pipe is coiled up on a take-up reel after the last stage, wherein said pipe passes through a pull-in collet between the two stages.

4. A process according to claim 3, wherein said welding step is performed at a welding point, and wherein the diameter of the metal pipe is reduced in three stages, with the first stage located between the welding point and a first pull-in collet through which the pipe passes, the second stage located between the first pull-in collet and a second pull-in collet through which the pipe passes and the third stage located between the second pull-in collet and a take-up reel.

5. A process according to claim 4, characterized in that a throughput rate of the metal pipe between the first and second pull-in collets is controlled by changing a draw rate of at least one of the first and second pull-in collets by means of a dancer unit.

6. A process according to claim 1, characterized in that the diameter is reduced in each stage by respectively one drawing matrix.

7. A process according to claim 1, characterized in that the diameter is reduced in each stage by a Turk's-head.

* * * * *